United States Patent [19]
Memon et al.

[11] Patent Number: 5,451,624
[45] Date of Patent: Sep. 19, 1995

[54] STABILIZED MODIFIER AND IMPACT MODIFIED THERMOPLASTICS

[75] Inventors: Nazir A. Memon, Yardley; Richard H. Weese, Washington Crossing, both of Pa.

[73] Assignee: Rohm and Haas Company, Philadelphia, Pa.

[21] Appl. No.: 196,742

[22] Filed: Feb. 15, 1994

[51] Int. Cl.$^6$ .................. C08K 5/526; C08K 5/36; C08K 5/13
[52] U.S. Cl. .................. 524/151; 524/305; 524/291; 524/330; 524/417; 525/69; 525/902
[58] Field of Search .................. 525/902, 69; 524/417, 524/330, 304, 305, 151, 153, 291, 289

[56] References Cited

U.S. PATENT DOCUMENTS

| | | | |
|---|---|---|---|
| 3,027,352 | 3/1962 | Walling et al. | 260/67 |
| 3,170,896 | 2/1965 | Wagner et al. | 260/67 |
| 3,479,319 | 11/1969 | Hergerrother | 524/417 |
| 3,527,730 | 9/1970 | Coulson et al. | 524/417 |
| 4,017,558 | 4/1977 | Schmidt et al. | 260/880 |
| 4,419,471 | 12/1983 | Nelsen et al. | 525/902 |
| 4,424,307 | 3/1984 | DiEdwardo et al. | 525/154 |
| 4,543,383 | 9/1985 | Heil et al. | 525/902 |
| 4,639,488 | 1/1987 | Schuette et al. | 524/456 |
| 4,801,646 | 1/1989 | Henton | 525/902 |
| 4,857,572 | 8/1989 | Meier et al. | 524/289 |
| 4,877,821 | 10/1989 | Hall et al. | 524/417 |
| 4,965,301 | 10/1990 | Leininger | 524/417 |
| 5,008,313 | 4/1991 | Kishida et al. | 524/289 |
| 5,047,471 | 9/1991 | Burg et al. | 525/66 |
| 5,164,434 | 11/1992 | Liwak et al. | 524/100 |
| 5,183,858 | 2/1993 | Sasaki et al. | 525/308 |
| 5,186,993 | 2/1993 | Hallden-Abberton et al. | 525/902 |
| 5,268,430 | 12/1993 | Wang | 525/902 |

*Primary Examiner*—Veronica P. Hoke
*Attorney, Agent, or Firm*—Darryl P. Frickey; Roger K. Graham

[57] ABSTRACT

The invention relates to improved thermoplastic compositions composed of one or more thermoplastics (component A), and a stabilized MBS core shell graft copolymer (component B) formed from a rubber-elastic core based on polybutadiene, and a hard graft shell.

The stabilized MBS core shell graft copolymer (component B) contains a special stabilization formulation of at least one hindered phenol, a phosphite, an organic sulfide, and optionally a pH buffer system. The stabilized MBS core shell graft copolymer improves the impact strength and heat aging properties of thermoplastic compositions and polyacetal compositions.

The shaped articles produced from the improved thermoplastic compositions are particularly distinguished by an excellent high-temperature impact strength and a good heat aging performance.

23 Claims, No Drawings

STABILIZED MODIFIER AND IMPACT MODIFIED THERMOPLASTICS

FIELDS OF THE INVENTION

Thermoplastics

Thermoplastic materials play an important role in the plastics industry by providing materials that soften and flow upon application of pressure and heat.

The present invention relates to: 1) a stabilized MBS core shell graft copolymer (component B), and 2) molding compositions of thermoplastics (component A) and a stabilized core shell rubber-elastic graft copolymer (component B), in which the particles have been formed from a rubber-elastic core based on polybutadiene and a hard graft shell. Component B contains a special stabilization formulation of at least one hindered phenol, a phosphite, an organic sulfide, and optionally a pH buffer system, such as disodium hydrogen phosphate, trisodium phosphate, a mixture of disodium hydrogen phosphate and trisodium phosphate, or a mixture of sodium hydroxide and phosphoric acid.

The thermoplastic shaped articles produced from these mixtures are particularly distinguished by an excellent high-temperature impact strength and a good heat aging performance.

Polyacetals

Polyacetal compositions, which are also referred to as polyoxymethylene (POM) compositions, are generally understood to include compositions based on homopolymers of formaldehyde or of cyclic oligomers of formaldehyde, for example, trioxane, the terminal groups of which are endcapped by esterification or etherification, as well as copolymers of formaldehyde or of cyclic oligomers of formaldehyde, with oxyalkylene groups which have at least two adjacent carbon atoms in the main chain. The proportion of the comonomers can be up to 20 percent (%) by weight.

Polyacetal molding compositions have been in commercial use for many years. Because of their excellent mechanical properties such as high stiffness, hardness and strength, creep resistance and fatigue resistance as well as high elastic recovery and their good resistance to many chemicals, they have applications in a wide variety of end uses, particularly in the engineering field, for example, in automotive applications or in household applications, for machine parts or in the electrical or electronic industries. However for a number of potential applications the impact resistance and flexibility is too low.

The present invention relates a stabilized MBS core shell graft copolymer (component B) in which the particles have been formed from a rubber-elastic core based on polybutadiene and a hard graft shell. Component B contains a special stabilization formulation of at least one hindered phenol, a phosphite, an organic sulfide, and optionally a pH buffer system, such as disodium hydrogen phosphate, trisodium phosphate, a mixture of disodium hydrogen phosphate and trisodium phosphate, or a mixture of sodium hydroxide and phosphoric acid.

BACKGROUND OF THE INVENTION

Thermoplastics

A number of methods are known for improving the toughness properties of thermoplastics. These include incorporating impact modifying polymers, such as methacrylate-butadiene-styrene resins, which are multistage polymers having a butadiene polymer or copolymer, optionally containing vinylaromatics, as for examples styrenics, (meth)acrylic and methacrylic copolymers, into thermoplastics such as polycarbonate resins or polyester-polycarbonate blends; these copolymers typically possess a core-shell (multi-stage) morphology.

Unfortunately, the aging behavior of these impact modifiying modifiers at elevated temperatures is not satisfactory, and this limits their application, for example for automotive parts. The object of the present invention was, therefore, to provide a toughened thermoplastic composition which, compared with known systems, possesses, at temperatures down to $-40°$ C., considerably improved toughness properties, and at temperatures up to 160° C. good aging properties combined with a satisfactory thermostability in the melt at temperatures up to 320° C.

It has now been found that this object can be achieved for thermoplastics, surprisingly, by employing a specially stabilized toughening component, namely a stabilized core shell rubber-elastic graft copolymer composed of a rubber-elastic polybutadiene core, a hard graft shell composed of styrene and PMMA and a special stabilization formulation. The special stabilization formulation consists of at least one hindered phenol, a phosphite, a sulfide, and optionally a pH buffer system.

In contrast, the addition of common stabilizers to a core shell rubber elastic copolymer either did not improve the heat aging properties to a satisfactory extent or the thermostability in the melt deteriorated to an unacceptable extent.

Polyacetals

A number of methods are known for improving the toughness properties of polyacetals, by incorporating crosslinked or uncrosslinked elastomers, in some cases also grafted elastomers. The following may be mentioned as examples: POM modified with polyurethanes (German Patent No. 1,193,240), POM modified with a graft copolymer prepared on an acrylic ester/butadiene basis (German Patent No. 1,964,156), POM modified with polybutadiene (U.S. Pat. No. 4,424,307) or POM modified with a polydiene/polyalkyleneoxide block copolymer (German Patent No. 2 408 487). However these mixtures do not show sufficient low-temperature impact strength for many applications.

EP 156,285 and EP 181,541 describe mixtures of POM and core shell rubber-elastic graft copolymers in which the particles have been formed from a rubber-elastic core based on polydiene and a hard graft shell with improved low-temperature impact resistance. The aging behavior of these mixtures at elevated temperatures however is not satisfactory, which limits their application for example for automotive parts. The object of the present invention was, therefore, to provide a toughened POM composition which, compared with known systems, possesses, at temperatures down to $-40$ ° C., considerably improved toughness properties, and at temperatures up to 100 ° C. good aging properties combined with a satisfactory thermostability in the melt at temperatures up to 230 ° C.

It has now been found that this object can be achieved, surprisingly, by employing a specially stabilized toughening component, namely a stabilized core shell graft copolymer composed of a rubber-elastic polybutadiene core, a hard graft shell composed of styrene and PMMA and a special stabilization formulation. The special stabilization formulation consists of at least one hindered phenol, a phosphite, a sulfide, and a pH buffer system.

In contrast, the addition of common stabilizers to a core shell rubber copolymer either did not improve the heat aging properties to a satisfactory extent or the thermostability in the melt deteriorated to an unacceptable extent.

SUMMARY OF THE INVENTION

Thermoplastics

The invention relates to: 1) a stabilized MBS core shell graft copolymer (component B) useful in thermoplastics, and 2) an improved thermoplastic composition comprising one or more thermoplastics (component A) and 5-50% by weight relative to the total mixture of a stabilized MBS core shell graft copolymer (component B) formed from a rubber-elastic core based on polybutadiene and a hard graft shell. Component B, in addition to the MBS core shell graft copolymer, contains a special stabilization formulation of at least one hindered phenol, a phosphite, a sulfide, and a pH buffer system, such as disodium hydrogen phosphate, trisodium phosphate, a mixture of disodium hydrogen phosphate and trisodium phosphate, or a mixture of sodium hydroxide and phosphoric acid.

Further, the invention relates to shaped articles produced from the improved thermoplastic composition of this type. The shaped articles produced from the improved thermoplastic composition are particularly distinguished by an excellent low-temperature impact strength and a good heat aging performance.

An essential characteristic of the improved thermoplastic composition according to the invention is component B which contains a special stabilizer formulation of at least one hindered phenol, a phosphite, an organic sulfide, and a pH buffer system, such as disodium hydrogen phosphate, trisodium phosphate, a mixture of disodium hydrogen phosphate and trisodium phosphate, or a mixture of sodium hydroxide and phosphoric acid.

An improved thermoplastic composition comprising a thermoplastic and 5-50% by weight, relative to the total mixture, of:

(a) a stabilized MBS core shell graft copolymer formed from a rubber-elastic core comprising polybutadiene, a hard graft shell, and a stabilizer formulation composed of at least one hindered phenol, a phosphite, a sulfide and a pH buffer system, or (b) a combination of a sulfide, a MBS core shell graft copolymer containing one or more hindered phenols, a phosphite, and optionally, a pH buffer system, or (c) a combination of a sulfide, a phosphite, a MBS core shell graft copolymer containing one or more hindered phenols, and optionally, a pH buffer system, or (d) a combination of a sulfide, a MBS core shell graft copolymer containing one or more hindered phenols, a pH buffer system, and optionally, a phosphite.

Polyacetals

The invention relates to a stabilized MBS core shell graft copolymer (component B) formed from a rubber-elastic core based on polybutadiene and a hard graft shell, which is useful in polyacetal. Component B, in addition to the MBS core shell graft copolymer, contains a special stabilization formulation of at least one hindered phenol, a phosphite, a sulfide, and a pH buffer system, such as disodium hydrogen phosphate, trisodium phosphate, a mixture of disodium hydrogen phosphate and trisodium phosphate, or a mixture of sodium hydroxide and phosphoric acid.

An essential characteristic of the stabilized MBS core shell graft copolymer is the special stabilizer formulation of at least one hindered phenol, a phosphite, a sulfide, and a pH buffer system, such as disodium hydrogen phosphate, trisodium phosphate, a mixture of disodium hydrogen phosphate and trisodium phosphate, or a mixture of sodium hydroxide and phosphoric acid.

DESCRIPTION OF THE INVENTION

The present invention relates to: 1) improved thermoplastic compositions, and 2) a stabilized MBS core shell graft copolymer (component B) formed from a rubber-elastic core based on polybutadiene and a hard graft shell, which is useful in thermoplastics and polyacetals. Component B also contains a special stabilization formulation. If appropriate or desired, a polymeric third component or fillers may also be present in the improved thermoplastic compositions.

The subject matter of an improved polyacetal composition (Component A-1: polyacetal and Component B: a stabilized MBS core shell graft copolymer), is covered in a separate patent application (Ser. No. 08/196,743), which was filed on the same date as this patent application.

Component A: Thermoplastics

Component A, a thermoplastic, is defined as: polycarbonates; polyesters including poly(alkylene terephthalates) such as polyethylene terphthalate and polybutylene terephthalate; polyester and polycarbonate blends; polyurethanes; poly(aromatic ketones) such as polyether ketone, polyether ether ketone, polyether ketone ketone, polyketone; poly(phenylene ethers); poly(phenylene sulfides); phenoxy resins; polysulfones such as poly(ether sulfone), poly(aryl sulfone), polysulfone; poly(ether imides); poly(ether imide esters); copoly(ether imide esters); poly(ester carbonates); polyarylates such as poly(bisphenol A isophthalate); polyimides such as poly(glutarimides); aromatic polyimides; poly(styrene) including crystal poly(styrene) and high impact poly(styrene); polymers of vinyl toluene or para-methyl styrene; copolymers of styrene or alkyl substituted styrene with acrylonitrile or maleic anhydride; polyamides including crystalline and amorphous polyamides; acrylate-styrene-acrylonitrile resins; acrylonitrile-butadiene-styrene resins; poly(amide imides); nitrile resins; poly(-methyl pentene); olefin modified styrene-acrylonitrile; styrene-butadiene resins; acrylonitrile-chlorinated polyethylene-styrene resins; thermoplastic elastomers such as poly(ether esters), poly(ether amides), poly(styrene butadiene styrenes) and poly(styrene ethylene butylene styrenes); and copolymers and blends of the above. These matrix resins specifically listed above shall be indicated throughout by the terms "thermoplastic" or "thermoplastics" or "thermoplastic engineering resins."

Component A (thermoplastics) according to the invention, can, if appropriate, also contain various additives, such as stabilizers, nucleating agents, antistatic agents, light stabilizers, flame-retarding agents, strip agents, lubricants, plasticizers, pigments, dyestuffs, optical brighteners, processing aids and the like, the amount of which can be up to 50% by weight, relative to the total improved thermoplastic composition or total improved thermoplastic composition.

Additives may be incorporated into the thermoplastic prior or subsequent to incorporation of component B of the present invention, or they may be incorporated simultaneously, as by coagulating or spray drying mixed emulsions of component B and the additives, and incorporating the resulting material into the thermoplastic. Such procedures are conventional, and will be readily apparent to those skilled in the art.

Stabilizers include antioxidants, such as hindered phenols, for example components commercially available from Ciba Geigy Ag under the trademarks "Irganox 245", "Irganox 259", "Irganox 1010", "Irganox 1076" or "Irganox 1098".

Examples of suitable light stabilizers are α-hydroxybenzophenone derivatives and benzotriazole derivatives.

Suitable lubricants include waxes such as long chain amide waxes, long chain ester waxes or partly saponified ester waxes, oils and polyether glycidol.

Component A-1: Polyoxymethylene

Component A-1, polyoxymethylene (POM), which is also referred to as polyacetal, may be an oxymethylene homopolymer, e.g. a homopolymer of formaldehyde or trioxane, the hemiformal groups of which have been end-capped by acylation or etherification as disclosed, for example, in U.S. Pat. No. 3,170,896. Preferably, however, the acetal polymer is an oxymethylene copolymer prepared by copolymerizing trioxane with 0.1 to 20% by weight of a cyclic ether having at least two adjacent carbon atoms. Copolymers of this type are described in U.S. Pat. No. 3,027,352 of Wailing et al. Such copolymers may be described as having at least one chain containing between about 80 and about 99.9% by weight oxymethylene ($-O-CH_2-$) units interspersed with between about 0.1 and 20% by weight of $-O-R-$units wherein R is a divalent radical containing at least two carbon atoms directly linked to each other and positioned in the chain between the two valences with any substituent in the R radical being inert. Suitable comonomers are: a) cyclic ethers having 3, 4 or 5 ring members, and b) cyclic acetals other than trioxane having 5-11, preferably 5, 6, 7 or 8, ring members.

The preferred copolymers are those made up of oxymethylene and oxyethylene groups, such as copolymers of trioxane with dioxolane or with ethylene oxide, or those made up of oxymethylene and oxybutylene groups, such as copolymers of trioxane with butanediolformal.

Also contemplated as the acetal polymer are terpolymers prepared, for example, by reacting: a) trioxane and a cyclic ether or cyclic acetal, or b) trioxane and a cyclic ether and cyclic acetal, such as in the preparation of the oxymethylene copolymer, with a third monomer which is a bi-functional compound such as the diglycidyl ether of ethylene glycol, diglycidyl ether and diethers of 2 mols of glycidol and 1 mol formaldehyde, dioxane or trioxane, or diethers of 2 mols of glycidol and 1 mol formaldehyde, dioxane or trioxane, or diethers of 2 mols of glycidol and 1 mol of an aliphatic diol with 2 to 8 carbon atoms, preferably 2 to 4 carbon atoms, or a cycloaliphatic diol with 4 to 8 carbon atoms.

Examples of suitable bifunctional compounds include the diglycidyl ethers of ethylene glycol, 1,4-butanediol, 1,3-butanediol, cyclobutane-1,3-diol, 1,3-propane-diol, cyclohexane-1, 4-diol and 2,4-dimethylcyclobutane-1,3-diol, with butanediol diglycidyl ethers being most preferred. The bifunctional compound may be used for example in the range of 0.1 to 10 percent based on the weight of the total monomers. The terpolymer may be prepared using the same methods known in the art for preparing the copolymers.

The values of reduced specific viscosity (RSV values) of the polyoxymethylene are, in general, 0.3–2.0 dl/g, preferably 0.5–1.5 dl/g (measured in butyrolactone, stabilized with 2% by weight of diphenylamine, at 140° C. in a concentration of 0.5 g/100 ml) and the melt flow index values (MFI 190/2.16) are in most cases between 0.02 and 50 g/min. The crystallite melting point of the polyoxymethylene is within the range from 140° to 180° C., preferably 150°–180° C.; its density is 1.38–1.45 g/ml, preferably 1.40–1.43 g/ml (measured as specified in DIN 53.479).

Component A-1, can, if appropriate, also contain various additives, such as stabilizers, nucleating agents, antistatic agents, light stabilizers, flame-retarding agents, strip agents, lubricants, plasticizers, pigments, dyestuffs, optical brighteners, processing aids and the like, the amount of which can be up to 50% by weight, relative to the total improved thermoplastic composition or total improved polyacetalomposition.

Additives may be incorporated into the thermoplastic prior or subsequent to incorporation of component B of the present invention, or they may be incorporated simultaneously, as by coagulating or spray drying mixed emulsions of component B and the additives, and incorporating the resulting material into the thermoplastic. Such procedures are conventional, and will be readily apparent to those skilled in the art.

Suitable stabilizers against the effect of heat are, in particular nitrogen-containing stabilizers like polyamides, amides of polybasic carboxylic acids, amidines, hydrazines, ureas or urethanes, and alkaline earth metal salts of aliphatic monobasic to tribasic carboxylic acids which preferably contain hydroxyl groups and have 2-20 carbon atoms, for example calcium stearate, calcium ricinoleate, calcium propionate, calcium lactate and calcium citrate.

A wide variety of nitrogen-containing stabilizers may be employed in the practice of this invention. Suitable amidine compounds (i.e., a compound containing a carbon atom doubly bonded to one nitrogen compound and singly bonded to another) include the cyano-guanidine compounds such as cyano-guanidine itself (dicyandiamide) and other compounds containing the divalent 1-cyano-3, 3 guanidine radical.

Amine substituted triazines constitute another suitable class of amidine compounds. The preferred compounds of this class are amine substituted derivatives of symmetrical triazines, including guanamines (2,4-diamino-sym.-triazines), melamines (2,4,6-triamino-sym.-triazine), and substituted melamines.

Other suitable nitrogen-containing stabilizers include, for example, polyamides produced by the ternary polymerization of caprolactam, hexamethylene diamine adipate and hexamethylene diamine sebacate, such as those marketed by the E. I. DuPont de Nemours Company of Delaware, U.S.A., under the trade name Elvamide.

The amount of nitrogen-containing stabilizer used will vary depending upon the particular acetal polymer or thermoplastic used and the degree of stability desired.

Further stabilizers include antioxidants, such as hindered phenols, for example components commercially available from Ciba Geigy AG under the trademarks "Irganox 245", "Irganox 259", "Irganox 1010", "Irganox 1076" or "Irganox 1098".

Examples of suitable light stabilizers are α-hydroxybenzophenone derivatives and benzotriazole derivatives.

Suitable lubricants include waxes such as long chain amide waxes, long chain ester waxes or partly saponified ester waxes, oils and polyether glycidol.

Finally, there may be added to the inventive compositions, a nucleant or nucleating agent, such as talc, other finely divided silicates, powdered sulfates or carbonates, or a terpolymer of trioxane, ethylene oxide and butanediol diglycidyl ether.

Generally speaking, but not necessarily or mandatory, component A or A-1 of the present invention includes 0 to about 2% by weight of hindered phenol as an antioxidant; from 0 to about 0.3% by weight of an alkaline earth metal carboxylate salt; from 0 to about 1% by weight of a lubricant; from 0 to about 2% by weight of a nucleant; and from 0 to about 2% by weight of a nitrogen containing stabilizer compound.

More typically, but not necessarily or mandatory, component A or A-1 includes from about 0.2 to about 1% by weight of hindered phenol; from 0 to about 0.15% by weight of an alkaline earth metal carboxylate salt; from about 0.1 to about 0.5% by weight of a lubricant; from 0 to 1% by weight of a nucleant; and from about 0.005 to about 1.5% by weight of a nitrogen containing stabilizer compound.

Component B: Specially Stabilized Core Shell Graft Copolymer

An essential characteristic of the improved thermoplastic composition according to the invention is the content of component B, a specially stabilized core shell graft copolymer, the amount of which is, in general between 5 and 50% by weight, preferably between about 10 and about 40% by weight and particularly about 10 and about 30% by weight. The component B is a specially stabilized methacrylate-butadiene-styrene (MBS) core shell graft copolymer. The rubbery core is polybutadiene or poly(butadiene/styrene) with a polymethyl methacrylate or poly(methylmethacrylate/styrene) hard shell which is grafted onto the rubber core. The MBS core shell graft copolymers of the present invention are made by well known techniques of emulsion polymerization. In improved thermoplastic compositions, the special stabilizer formulation included in component B contains at least one hindered phenol, a phosphite, a sulfide, and a pH buffer system, such as disodium hydrogen phosphate, trisodium phosphate, a mixture of disodium hydrogen phosphate and trisodium phosphate, or a mixture of sodium hydroxide and phosphoric acid. The stabilized MBS core shell graft copolymer improves the impact strength and heat aging properties of thermoplastic compositions and polyacetal compositions. For POM, the special stabilizer formulation included in component B contains at least one hindered phenol, a phosphite, a sulfide, and a pH buffer system, such as disodium hydrogen phosphate, trisodium phosphate, a mixture of disodium hydrogen phosphate and trisodium phosphate, or a mixture of sodium hydroxide and phosphoric acid.

The hindered phenols useful in the present invention include octadecyl 3-(3',-5'-di-tert-butyl-4'-hydroxy phenyl) propionate, hexamethylene bis (3,5-di-tertiarybutyl-4-hydroxy hydrocinnamate), 1,1,3-tris(2'-methyl-5'-tert-butyl-4'-hydroxyphenyl)butane, 2,6-di-tert-butyl cresol, ethylene bis(oxyethylene) bis(3-tert-butyl-4-hydroxy-5-methylhydrocinnamate), and mixtures thereof. The hindered phenols may be used at levels of about 0.2 to about 1.5 weight percent, preferably about 0.4 to about 1.0 weight percent, of component B.

The organic phosphites of this invention include aliphatic and aromatic phosphites, such as tris(monononylphenyl) phosphite, bisnonylphenyl pentaerythritol diphosphite, bis(2,4-di-tert-butylphenyl)pentaerythritol diphosphite, tris(2,4-di-tert-butylphenyl)phosphite, tris(mixed mono-or di-nonylphenyl)phosphite, and the like. The organic phosphites may be used at levels of about 0.1 to about 0.8 weight percent, preferably about 0.2 to about 0.4 weight percent, of component B.

The sulfides of this invention have one or more of the following sulfide groups:

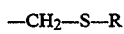

—CH$_2$—S—R wherein R is an alkyl group of from 1 to 20 carbon atoms, and preferably 7 to 12 carbon atoms. The examples include: 2,4-bis[(octylthio)methyl]-o-cresol, pentaerythritol tetrakis (octyl thiopropionate), trimethylolpropane tris(octyl thiopropionate) and pentaerythritol tetrakis(β-lauryl thiopropionate), and the like. Sulfides where R is an alkyl alkanoate are not contemplated in this invention, and examples of these sulfides include: dilaurylthiodipropionate and dimyristyl thiodipropionate. The sulfides of this invention may be used at levels of about 0.25 to about 2.0 weight percent, preferably about 0.8 to about 1.6 weight percent, of component B.

The pH buffer system of disodium hydrogen phosphate and trisodium phosphate is added to adjust the pH to the range of about 7 to about 11. Disodium hydrogen phosphate or trisodium phosphate may be added singularly to adjust the pH to the range of about 7 to about 11. In place of sodium salts, a pH buffer system of sodium hydroxide and phosphoric acid may be used to adjust the pH. The pH buffer system is optional in the improved thermoplastic composition.

A surfactant may be included with the stabilizer to provide an emulsion of the stabilizer. Examples of surfactants suitable for use with the stabilizers of the invention include: sodium dodecylbenzene sulfonate and potassium oleate. The amount of the surfactant typically constitutes 5 to 25% by weight of the special stabilizer formulation depending on the specific properties of the surfactant. Besides the special stabilizer formulation, additional stabilizers may be added to component B, but the cost/benefit ratio decreases as more stabilizers are added, since costs will increase proportionally as more stabilizers are added to component B.

The inventors have found that the constituents of component B may be singularly added to component A or A-1 (thermoplastics or POM, respectively) to achieve the same result as the combination of component A or A-1 and component B.

In thermoplastics for example, an MBS core shell graft copolymer (containing two hindered phenols such as 1,1,3-tris(2'-methyl-5'tert-butyl-4'-hydroxyphenyl)-butane and 2,6-di-tert-butyl cresol and an organic phosphite), a sulfide, and optionally a pH buffer system may be added as singular constituents to a thermoplastic to get the same excellent high-temperature impact strength and good heat aging performance results as combining thermoplastic (component A) and component B. Separation of the constituents of component B and combining them singularly with thermoplastic (component A) is viewed as an embodiment of the invention, such that an improved thermoplastic composition comprising thermoplastic (component A) and 5–50% by weight, relative to the total mixture of combinations such as: a) a sulfide, a MBS core shell graft copolymer containing one or more hindered phenols, a phosphite, and optionally, a pH buffer system, or b) a sulfide, a phosphite, a MBS core shell graft copolymer containing one or more hindered phenols, and optionally, a pH buffer system, or c) a sulfide, a MBS core shell graft copolymer containing one or more hindered phenols, a pH buffer system, and optionally, a phosphite, are embodied in the invention. Applicants have found that a pH buffer system may be optional when constituents of component B are singularly added to thermoplastics (component A) and pH buffering of the constituents of component B is not necessary. Further, Applicants have found that a phosphite may be optional when constituents of component B are added singularly to thermoplastics (component A).

Other Components

It should be understood that the compositions of the present invention can include in addition to: 1) the stabilized MBS core shell graft copolymer, or 2) component A (thermoplastic) and the stabilized MBS core shell graft copolymer, other additives, modifiers, fillers and ingredients, as are generally used in stabilized MBS core shell graft copolymers or thermoplastic molding resins.

If appropriate or desired, a polymeric third component may also be present, where such third component is not the same as component A or component B. Possible third components include thermoplastics as described herein, such as polyurethanes, polyolefins, modified polyolefins, polyamides, polyacrylates, polyesters, polycarbonates or fluoropolymers, for improving other properties, for example, friction and wear properties, processing behavior, surface appearance (e.g., gloss), weatherability or manufacturing cost reduction (i.e. better economic costs).

Furthermore, the improved thermoplastic composition according to the invention can also contain customary fillers. The following are examples of these: filamentous reinforcing materials, such as glass fibers or carbon fibers; non-fibrous fillers, such as glass powder, graphite, carbon black, metal powders, metal oxides, silicates, carbonates and molybdenum (IV) sulfide. These fillers can be treated with an adhesion promoter or adhesion promoter system. If used, the amount of filler is up to 50% by weight, preferably 5 to 40% by weight, relative to the total mixture. Most preferably, the mixture according to the invention does not contain fillers.

Preparation of the Improved Thermoplastic Compositions

The preparation of the improved thermoplastic composition according to the invention is effected by vigorously mixing the components at an elevated temperature, in general, at temperatures above the melting point of component A, that is to say at about 160° to 320° C., in units having a good mixing action, such as, for example, mixing rolls, kneaders or preferably extruders, most preferably twin-screw extruders. It has been found that the size and distribution of the elastomer particles in the matrix has a considerable effect on the mechanical properties of the improved thermoplastic composition. The mixing of the components should, therefore, be effected in such a way that the component B is distributed as homogenously as possible in the polymer matrix, and that the particle size of the particles of the component B in the improved thermoplastic composition according to the invention is within the range between 0.1 and 5 $\mu$m, preferably between 0.1 and 1 $\mu$m.

After melt mixing, the improved thermoplastic composition can be pelletized, chopped or grinded to give granules, chips, flakes or powders.

The improved thermoplastic composition according to the invention is thermoplastic and thus accessible to all the processing procedures typical of thermoplastic compositions.

Using methods known to those skilled in the art, component B of the present invention may be incorporated into the thermoplastic at from about 1% to about 50% of the total weight of resin plus polymer. Higher levels may be used within the scope of the present invention, but may deleteriously affect the balance of other physical properties, such as the heat distortion temperature, of the resin in specific applications. A more preferred range is from about 2 to about 25%. Component B may, for example, be incorporated into the thermoplastic by blending component B, as a dry powder or pellets, with a dry powder or pellets of the matrix resin. Alternatively, if the thermoplastic and the component B have been separately prepared as emulsions, the emulsions may be mixed and isolated as an intimate mixture by conventional methods such as coagulation or spray drying, or as yet another alternative, the emulsions may be isolated separately and sequentially in the same equipment, this process being termed "staged coagulation." As a less preferred method, the monomers used to prepare component B may be polymerized in the presence of the thermoplastic polymer, but the polymerization conditions must be carefully controlled, or the molecular weight of the resulting polymer will be too low to be fully effective.

The improved thermoplastic compositions may be processed by injection molding, extrusion, melt spinning or deep-drawing to give shaped articles of any desired kind, and is suitable as an industrial material for the production of semifinished and finished components, for example tapes, rods, sheets, films, tubes and hoses and also parts of machines, for example, casings, gearwheels, snapfittings, bearing components and control elements, automobile parts especially under the hood parts such as clips, or interior accessories such as loud speaker grills and the like. Further automotive uses, such as bumpers, spoiler panels, dashboard panels, rear window panels, external air spoilers, seat backs, truck bed liners, wind deflectors, motorcycle fairings and skirtings and the like. Further uses may include toys, such as tricycles, surfboards, exercise equipment, television housings, computer housings, other equipment housings, such as typewriter cases, appliance housings, and the like. Still further uses include containers such as bottles, tanks for organic or inorganic liquids, and the like. Formed materials may be made and be useful in buildings, such as decorative or tough protective panels, thermoformed panels, seating construction, pipe, profiled shapes for window and door construction and the like. Foamed articles such as sheet, rods, tubes, and especially profile will be useful where the shape retention and load-bearing properties of the engineering resin are maintained but with a lighter weight construction; such uses will include panels, equipment housing, window and door frames, toys, automotive uses, athletic equipment, and the like. Many other uses for such tough, heat resistant plastics having excellent high-temperature impact strength and a good heat aging performance will be readily apparent to those skilled in the art.

The following examples are presented to illustrate a few embodiments of the invention, but we do not intend the invention to be limited to the illustrated embodiments. All parts and percentages are by weight unless otherwise indicated.

EXAMPLES

The following parameters and tests are used in the examples to illustrate the present invention:

MFI 190/2.16: Melt flow index as specified in DIN 53.735 at 190° C., 2.16 kg.

MVI 190/15: Melt flow volume index as specified in DIN 53.735 at 190° C., 15 kg.

Weight loss under nitrogen (N$_2$), 240° C.: On 1.5 g pellets in an aluminum (Al) sample holder, in a thermobalance under nitrogen after 1 hour.

Weight loss under air, 230° C.: On 5.0 g pellets in an Al-pan of diameter of 5.5 cm in an oven under air, after 45 min. or 2 hours respectively.

Weight loss under air, 150° C.: On 2.5 g pellets in an Al-pan of diameter of 5.5 cm. in an oven under air after 64 hours.

$a_{kv}$: V-notched impact strength as specified in DIN 53.453 on a standardized small bar 50×6×4 mm with a v-notch of radius 1.0 mm, measured at 23 ° C. For heat aging at 100° C. in an oven under air the 50×6×4 mm-test samples were notched before aging.

Damaging energy, Ws: As specified in DIN 53.443 on 60×60×2 mm plaques, measured at 23° C. and at −40° C.

DSC Test: Tests are made in which the time to exotherm is measured. The time to exotherm is the time required to achieve the maximum exotherm rate as measured by differential scanning calorimetry (DSC), with a 15–20 milligram sample held at 190° C. in air. In the DSC test, the relative thermal stability is clearly demonstrated by the length of time to exotherm (exotherm providing an excellent indication of rapid degradation.)

Yellowness index, NG: As specified in DIN 6.167/ASTM D1925, before and after heat aging of the plaques at 100° C. or 150° C., respectively, in an oven under air.

The pH of the emulsion was tested using a convention pH meter, such as an Orion pH meter.

Preparation of the Improved Thermoplastic Compositions

As illustrated below, component A and component B and optionally other components were mixed in a fluid-mixer and then fed into a twin screw extruder of the type Werner and Pfleiderer ZDSK 28, with a l/d ratio of 28 and a kneading zone for an intimate mixing of the components in the melt. The melt temperature profile over the barrel of the extruder was 190°–220°–200° C. The melt strand was cooled with water and pelletized. The pellets were dried at 80° C. under vacuum for 24 h. The pellets were injection molded in the customary way to the test specimens. The comparative examples and comparative test specimens were similarly prepared.

Example 1—Preparation of the MBS Polymer Latex

A stainless steel autoclave with an agitator and several entry ports was charged with 5 parts of a diphenyl oxide sulfonate emulsifier in 2688 parts of de-ionized water and 4.9 parts of sodium formaldehyde sulfoxylate and brought to pH of 4.

The autoclave was evacuated and 2297 parts of butadiene, 96.8 parts of styrene, 12 parts of cumene hydroperoxide, and 24.6 parts of divinyl benzene were added and caused to react at 70° C. over 9 hours. An additional 36.9 parts of emulsifier was also added. At the end of the reaction period no further pressure drop was observed, the residual pressure was vented.

To 4000 parts of the rubber latex having approximately 48% solids, as prepared above, were added 272 parts of styrene followed by 0.544 parts of sodium formaldehyde sulfoxylate dissolved in 416 parts of de-ionized water and 1.088 parts cumene hydroperoxide. One hour after completion of the exotherm, 280 parts of methyl methacrylate, 2.816 parts of butylene dimethacrylate, 0.28 parts of sodium formaldehyde sulfoxylate dissolved in 80 parts of de-ioninzed water, and 0.560 parts of cumene hydroperoxide were added and caused to react to completion. The resulting MBS Polymer Latex had approximately 49% solids.

Example 2—Preparation of the Stabilizer Formulation 7.83 parts of the ethylene bis(oxyethylene) bis(3-tert-butyl-4-hydroxy-5-methyl hydrocinnamate), 7.83 parts of tris(mononylphenyl) phosphite, and 23.52 parts of pentaerythritol tetrakis (β-lauryl thiopropionate) were charged to a reaction vessel while heating to 85° C. When the mixture began to melt (at approximately 70° C.), it was vigorously agitated to yield a homogeneous melt. 43.16 parts of 22.5% solution of sodium dodecyl benzene sulfonate were charged. The emulsion was agitated for 10 minutes, and 17.1 parts of de-ionized water were added to the emulsion. After an additional 15 minutes of mixing, the stabilizer emulsion was ready for addition to the MBS polymer latex of Example 1 as described in Example 3, below. The resulting Stabilizer Formulation had approximately 49% solids.

Example 3—Preparation of the Stabilized MBS Polymer Emulsion (component B)

4000 parts of MBS polymer latex as prepared in Example 1 were heated to 50° C. in a reaction vessel with agitation. 114.5 parts of 2.5% solution of sodium hydroxide and 100 parts of 2% solution of phosphoric acid were added to bring the pH to 7.5 to 8.0. The stabilizer emulsion prepared in Example 2 was then added. The resulting stabilized MBS polymer emulsion was agitated for 20 minutes at 50° C., then cooled to less than 40° C. The stabilized MBS polymer was isolated by spray drying, but can be isolated by other methods such as freeze drying and coagulation. The resulting Stabilized MBS Polymer Emulsion had approximately 48% polymer solids. After isolation, the resulting MBS Polymer contains 0.4% of ethylene bis(oxyethylene) bis(3-tert-butyl-4-hydroxy-5-methyl hydrocinnamate), 0.4% of tris(mononylphenyl) phosphite, and 1.2% of pentaerythritol tetrakis (β-lauryl thiopropionate).

Comparative Examples 4A, 4B, 4C and 4D and Example 4—Comparison of Impact Strength, Thermal Stability in the Melt and Color Stability of Various Stabilized MBS Modifiers in POM Composition Below is a comparison of impact strength (notched Charpy) before and after heat aging, thermal stability in the melt (weight loss), and color stability (change in yellowness) in a POM composition using various stabilized MBS modifiers.

TABLE I

| Example Number and Composition (75% POM + 25% MBS (#)) (% - weight percent) | Impact Strength-Notched Charpy-As molded [mJ/mm²] | Impact Strength-Notched Charpy-Heat Aged 1000 hrs at 100° C. [mJ/mm²] | Thermal Stability in the melt Weight Loss N₂, 240° C., 1h, [%] | Thermal Stability in the melt Weight Loss 230° C., air, 2h, [%] | Color Stability Change in Yellowness Index/Heat Aging 6h/150° C. |
|---|---|---|---|---|---|
| Comp. Ex. 4A POM + MBS (1) | 38 | 15 | 0.9 | 19.2 | 37 |
| Comp. Ex. 4B POM + MBS (2) | 19 | 12 | 0.3 | 15.3 | 21 |
| Comp. Ex. 4C POM + MBS (3) | 27 | 13 | 0.8 | 13.7 | 23 |
| Comp. Ex. 4D POM + MBS (4) | 50 | 35 | 1.5 | 54.1 | 19 |
| Example 4 POM + MBS (5) | 48 | 40 | 1.3 | 25.4 | 14 |

Comparative Examples 4A, 4B, 4C and 4D

MBS (1): MBS of Example 1 stabilized with: (a) 0.4% of 2,6-di-tert-butyl cresol, (b) 0.13% of 1,1,3-tris(2'-methyl-5'tert-butyl-4'-hydroxyphenyl) butane, and (c) 0.4% of tris(mixed mono- or dinonylphenyl)phosphite. Comparative to component B.

MBS (2): MBS of Example 1 stabilized with: (a) 1.4% of octadecyl 3,5-di-tert-butyl-4-hydroxyhydrocinnamate, and (b) 0.4% of tris(mono-nonylphenyl)phosphite. Comparative to component B.

MBS (3): MBS of Example 1 stabilized with: (a) 1.4% of octadecyl 3,5-di-tert-butyl-4-hydroxyhydrocinnamate, and (b) 0.4% of 1,1,3-tris(2'-methyl-5'tert-butyl-4'-hydroxyphenyl)butane. Comparative to component B.

MBS (4): MBS of Example 1, with pH raised to 7.5 using 2.5% sodium hydroxide solution and 2% phosphoric acid solution in the amounts shown in Example 3, stabilized with: (a)0.4% ethylene bis(oxyethylene) bis(3-tert-butyl-4-hydroxy-5-methyl hydrocinnamate), (b) 0.4% of tris(mixed mono- or dinonylphenyl)phosphite, and (c) 1.2% of dilaurylthiodipropionate. Comparative to component B.

POM: Hostaform C 9021—POM-Copolymer formed from trioxane and approx. 2% by weight of ethyleneoxide, available from Hoechst AG, Frankfurt am Main, Germany, under the trademark Hostaform C 9021, containing the customary stabilizers and additives, MFI 190/2.16 is approximately 9, (component A-1).

Example 4

MBS (5): Stabilized MBS of Example 3 (component B).

POM: Hostaform C 9021—available from Hoechst AG, Frankfurt am Main, Germany, (component A-1 ).

Note: The weight percentage (25%) of the MBS Modifier in Example 4 and Comparative Examples 4A, 4B, 4C and 4D, is based on the polymer solids.

Comparative Examples 5–16

Comparison of Comparative Examples 5–16 (Table II) to Examples 5–14 (Table III) illustrate that the stabilized MBS Modifier (component B) of this invention provides improved properties in POM in comparison to other stabilized MBS modifiers.

Comparative Examples 5–11

Component A-1

POM: Hostaform C 9021.

Comparative-Component B

MBS core shell rubber elastic graft copolymer with a polybutadiene core and a methylmethacrylate/styrene shell (MBS (1) of Comparative Example 4A).

Comparative Examples 12 and 13

Component A-1

POM-Copolymer formed from trixoane and approx. 3% by weight of butanediolformal, available from BASF AG, Ludwigshafen, Germany, under the trademark Ultraform N 2320, containing the customary stabilizers and additives, MFI 190/2.16 is approximately 9, (Component A-1).

Comparative-Component B

MBS core shell rubber elastic graft copolymer with a polybutadiene core and a methylmethacrylate/styrene shell (MBS (1) of Comparative Example 4A).

Comparative Example 14

Component A-1

POM-Homopolymer formed from formaldehyde, available from E. I. DuPont de Nemours, Bad Homburg, Germany, under the trademark Delrin 500, containing customary stabilizers and additives, MFI 190/2.16 is approximately 10.

Comparative-Component B

MBS core shell rubber elastic graft copolymer with a polybutadiene core and a methylmethacrylate/styrene shell (MBS (1) of Comparative Example 4A).

Comparative Examples 15 and 16

Component A-1

POM-Copolymer formed from trioxane and approx. 2% by weight of ethyleneoxide, available from Hoechst AG, Frankfurt am Main, Germany, under the trademark Hostaform C 9021, containing the customary stabilizers and additives, MFI 190/2.16 is approximately 9.

Comparison-Component B

MBS core shell rubber elastic graft copolymer with a polybutadiene core and a methylmethacrylate/styrene shell (MBS (1) of Comparative Example 4A).

Comparative Examples 8, 9, 13, 15 and 16

By the further addition of stabilizers to the stabilized MBS modifiers in Comparative Examples 8, 9, and 13, heat aging properties were not improved to a satisfactory extent by the addition of: (1) Irganox 1010 (Pentaerythritol-tetrakis [3-(3,5-ditert.butyl-4-hydroxiphenyl)-propionate] commercially available from Ciba-Geigy AG, Basel, Switzerland), or (2) Hostanox PAR 24 (Tri(2,4-di-tert.-butylphenyl) phosphite commerically available from Hoechst AG, Frankfurt am Main, Germany). In Comparative Examples 15 and 16, the thermostability in the melt deteriorated by an unacceptable extent by adding Irganox PS 800 (Dilaurylthiodipropionate commercially available from Ciba-Geigy AG, Basel, Switzerland).

Examples 5–11

Component A-1

POM-Copolymer formed from trioxane and approx. 2% by weight of ethyleneoxide, available from Hoechst AG, Frankfurt am Main, Germany, under the trademark Hostaform C 9021, containing the customary stabilizers and additives, MFI 190/2.16 is approximately 9.

Component B 4000 gms of MBS polymer latex of Example 1,130.7 gms of 2.5% sodium hydroxide, 120 gms of 2% phosphoric acid and stabilizer formulation of Example 2.

Examples 12 and 13

POM-Copolymer formed from trioxane and approx. 3% by weight of butanediolformal, available from BASF AG, Ludwigshafen, Germany, under the trademark Ultraform N 2320, containing the customary stabilizers and additives, MFI 190/2.16 is approximately 9.

Component B: Same as Component B of Examples 5-11.

Example 14

POM-Homopolymer formed from formaldehyde, available from E. I. DuPont de Nemours, Bad Homburg, Germany, under the trademark Delrin 500, containing the customary stabilizers and additives, MFI 190/2.16 is approximately 10.

Component B: Same as Component B of Examples 5-13.

Examples 8, 9 and 13: In these examples, stabilizers such as Irganox 1010 (pentaerythritol-tetrakis [3-(3,5-ditert.butyl-4-hydroxyphenyl)propionate] commercially available from Ciba-Geigy AG, Basel, Switzerland) or Hostanox PAR 24 (Tri(2,4-di-tert.-butylphenyl) phosphite commerically available from Hoechst AG, Frankfurt am Main, Germany) were added to the stabilized MBS modifier. The addition of these stabilizers show no significant improvement in properties of Examples 8, 9 over Example 7, or Example 13 over Example 12 (Table III). No significant improvement is seen by the use of additional stabilizers.

TABLE II

Results of Comparative Examples 5-16

| Comparative Example Number | Composition % POM/% MBS | MVI 190° C., 15 kg [cm³/10 min] | Damaging Energy 23° C. [J] | Damaging Energy −40° C. [J] | Weight Loss air, 230° C., 45 min [%] | Weight Loss air, 150° C., 64 h [%] | Yellowness Index before heat aging | Yellowness index after heat aging 1000 h at 100° C. | akv before heat aging [mJ/mm²] | akv after heat aging 1000 h at 100° C. [mJ/mm²] |
|---|---|---|---|---|---|---|---|---|---|---|
| Comp. Example 5 | Comp. A-1 90% Hostaform C 9021 Comp B - 10% MBS (1) | 59.1 | 12.1 | 2.2 | 1.3 | 0.6 | 1.5 | 43.1 | 15.3 | 10.6 |
| Comp. Example 6 | Comp. A-1 80% Hostaform C 9021 Comp B - 20% MBS (1) | 49.2 | 18.7 | 4.4 | 3.5 | 0.6 | 1.3 | 55.6 | 33.7 | 18.5 |
| Comp. Example 7 | Comp A-1 75% Hostaform C 9021 Comp B - 25% MBS (1) | 39.0 | 25.2 | 6.4 | 4.6 | 0.7 | 1.4 | 58.3 | 40.2 | 19.2 |
| Comp. Example 8 | Comp. A-1 74.3% Hostaform C 9021 0.7% Irganox 1010 Comp. B - 25% MBS (1) | 38.0 | 23.8 | 5.1 | 4.0 | 0.5 | 1.7 | 46.2 | 41.1 | 25.3 |
| Comp. Example 9 | Comp. A-1 74.5% Hostaform C 9021 0.5% Hostanox PAR 24 Comp. B - 25% MBS (1) | 38.5 | 24.7 | 5.3 | 4.1 | 0.6 | 2.1 | 49.4 | 39.3 | 22.6 |
| Comp. Example 10 | Comp. A-1 70% Hostaform C 9021 Comp. B - 30% MBS (1) | 32.8 | 27.3 | 7.6 | 5.4 | 0.7 | 1.6 | 66.8 | 46.4 | 20.4 |
| Comp. Example 11 | Comp. A-1 60% Hostaform C 9021 Comp. B - 40% MBS (1) | 19.3 | 29.4 | 8.7 | 9.6 | 0.9 | 1.9 | 79.7 | not broken | 18.2 |
| Comp. Example 12 | Comp. A-1 75% Ultraform N 2320 Comp. B - 25% MBS (1) | 36.8 | 25.1 | 6.2 | 14.2 | 0.5 | 3.7 | 29.9 | 41.3 | 19.8 |
| Comp. Example 13 | Comp. A-1 74% Ultraform N 2320 1.0% Irganox 1010 Comp. B - 25% MBS (1) | 34.8 | 23.8 | 5.6 | 16.5 | 0.8 | 3.9 | 26.3 | 40.7 | 22.7 |
| Comp. Example 14 | Comp. A-1 75% Delrin 500 Comp. B 25% MBS (1) | 50.0 | 21.2 | 4.8 | 30.9 | 28.9 | 8.3 | 65.4 | 33.6 | 14.4 |
| Comp. Example 15 | Comp. A-1 74.8% Hostaform C 9021 0.2% Irganox PS 800 Comp B - 25% MBS (1) | 38.7 | 24.8 | 5.5 | 25.4 | 0.4 | 3.8 | 12.4 | 40.8 | 26.8 |
| Comp. Example 16 | Comp. A-1 74.5% Hostaform C 9021 | 38.9 | 24.0 | 5.3 | 28.4 | 0.4 | 4.1 | 10.5 | 39.4 | 27.3 |

TABLE II-continued
Results of Comparative Examples 5–16

| Comparative Example Number | Composition % POM/% MBS | MVI 190° C., 15 kg [cm³/10 min] | Damaging Energy 23° C. [J] | Damaging Energy −40° C. [J] | Weight Loss air, 230° C., 45 min [%] | Weight Loss air, 150° C., 64 h [%] | Yellowness Index before heat aging | Yellowness index after heat aging 1000 h at 100° C. | akv before heat aging [mJ/mm²] | akv after heat aging 1000 h at 100° C. [mJ/mm²] |
| --- | --- | --- | --- | --- | --- | --- | --- | --- | --- | --- |
| | 0.5% Irganox PS 800 Comp B - 25% MBS (1) | | | | | | | | | |

TABLE III
Results of Examples 5–14

| Example Number | Composition | MVI 190° C., 15 kg [cm³/10 min] | Damaging Energy 23° C. [J] | Damaging Energy −40° C. [J] | Weight Loss air, 230° C., 45 min [%] | Weight Loss air, 150° C., 64 h [%] | Yellowness Index before heat aging | Yellowness index after heat aging 1000 h at 100° C. | akv before heat aging [mJ/mm²] | akv after heat aging 1000 h at 100° C. [mJ/mm²] |
| --- | --- | --- | --- | --- | --- | --- | --- | --- | --- | --- |
| Example 5 | Comp. A-1 90% Hostaform C 9021 Comp B - 10%* | 67.4 | 11.8 | 2.4 | 2.1 | 0.3 | 1.8 | 3.5 | 16.2 | 14.7 |
| Example 6 | Comp. A-1 80% Hostaform C 9021 Comp. B - 20%* | 49.4 | 21.0 | 4.7 | 3.2 | 0.3 | 1.4 | 3.9 | 35.2 | 29.4 |
| Example 7 | Comp. A-1 75% Hostaform C 9021 Comp. B - 25%* | 40.5 | 26.2 | 5.8 | 3.7 | 0.3 | 1.4 | 4.1 | 50.8 | 40.1 |
| Example 8 | Comp. A-1 74.3% Hostaform C 9021 0.7% Irganox 1010 Comp. B - 25%* | 42.0 | 27.3 | 6.2 | 3.0 | 0.3 | 1.8 | 3.9 | 48.6 | 41.2 |
| Example 9 | Comp. A-1 74.5% Hostaform C 9021 0.5% Hostanox PAR 24 Comp. B - 25%* | 38.2 | 24.3 | 4.8 | 3.3 | 0.4 | 2.3 | 4.5 | 46.3 | 33.1 |
| Example 10 | Comp. A-1 70% Hostaform C 9021 Comp. B - 30%* | 35.5 | 28.1 | 8.3 | 5.0 | 0.3 | 1.8 | 4.3 | not broken | 43.3 |
| Example 11 | Comp. A-1 60% Hostaform C 9021 Comp. B 40%* | 22.3 | 31.3 | 9.4 | 4.9 | 0.4 | 2.1 | 4.7 | not broken | 41.5 |
| Example 12 | Comp. A-1 75% Ultraform N 2320 Comp. B - 25%* | 38.7 | 23.8 | 5.7 | 6.8 | 0.3 | 3.5 | 5.2 | 45.8 | 38.4 |
| Example 13 | Comp. A-1 74% Ultraform N 2320 1.0% Irganox 1010 Comp. B - 25%* | 40.0 | 26.3 | 6.7 | 6.0 | 0.3 | 3.9 | 5.0 | 44.9 | 39.6 |
| Example 14 | Comp. A-1 75% Delrin 500 Comp. B 25%* | 50.6 | 24.5 | 4.9 | 28.7 | 0.9 | 7.8 | 11.2 | 39.4 | 25.7 |

* = Component B of Examples 5–11 (as earlier taught herein).

Comparative Examples 17–19 and Examples 17–22: DSC Thermal Stability of Component B (Stabilized MBS Modifier): Effect of Sodium Hydroxide/Phosphoric Acid (pH Buffer) Addition Examples 17–22 illustrate that the MBS polymer latex of Example 1, when stabilized and pH buffered by sodium hydroxide and phosphoric acid as described herein, results in a thermally stable MBS Modifier, when compared to the stabilzer packages of Comparative Examples 17–19.

TABLE IV

| Example Number and MBS polymer latex | Stabilizer Package | 2.5% Sodium Hydroxide [g/4000 g of polymer emulsion] | 2% Phosphoric Acid [gms] | DSC @ 190° C. Time to Exotherm [minutes] |
|---|---|---|---|---|
| Comp. Ex. 17 MBS of Ex. 1 | MBS (4) | 0 | 0 | 12 |
| Comp. Ex. 18 MBS of Ex. 1 | MBS (4) | 56.8 | 49.7 | 11 |
| Comp Ex. 19 MBS of Ex. 1 | MBS (4) | 113.5 | 99.1 | 2 |
| Example 17 MBS of Ex. 1 | Example 2 | 0 | 0 | 47 |
| Example 18 MBS of Ex. 1 | Example 2 | 56.8 | 49.7 | 159 |
| Example 19 MBS of Ex. 1 | Example 2 | 113.5 | 99.1 | 191 |
| Example 20 MBS of Ex. 1 | 13S | 0 | 0 | 51 |
| Example 21 MBS of Ex. 1 | 13S | 56.8 | 49.7 | 280 |
| Example 22 MBS of Ex. 1 | 13S | 113.5 | 99.1 | 296 |

13S: Stabilizer package of Example 2 except pentaerythritol tetrakis (β-lauryl thioproprionate) was replaced with 2,4-bis[(octylthio)methyl]-o-cresol.

Organic Sulfide and the Use of pH Buffer

The sulfides, especially those claimed in this invention, are good stabilizers for MBS polymers. The use of these sulfides has a deleterious effect on thermal stability of the melt and therefore, adversely affects the processability of the resin. The Applicants' use of the pH buffers improves the thermal stability of the melt.

Comparative Examples 23 and 24 and Examples 23 and 24—Comparison of Impact Strength of Various Stabilized MBS Modifiers in Polybutylene Terephthalate (PBT) Compound Below is a comparison of the impact strength (notched Charpy) and percent ductile breaks in a PBT compound using various stabilized MBS modifiers.

TABLE V

| Oven Aging at 160° C. (hours) | NOTCHED IZOD (mJ/mm) | | | |
|---|---|---|---|---|
| | MBS (1) + PBT | MBS (4) + PBT | MBS (5) + PBT | MBS (6) + PBT |
| 0 | 930 (100) | 940 (100) | 940 (100) | 880 (100) |
| 12 | 890 (100) | 880 (100) | 950 (100) | 890 (100) |
| 24 | 680 (80) | 840 (100) | 950 (100) | 840 (100) |
| 36 | 440 (10) | 520 (20) | 910 (100) | 830 (100) |
| 48 | 240 (0) | 120 (0) | 880 (100) | 690 (80) |
| 60 | 165 (0) | 110 (0) | 760 (80) | 100 (0) |

The number in the brackets ( ) after the notched izod value is the percent ductile break of the tested sample. MBS (6) was the same as MBS (5) except in the stabilizer package, pentaerythritol tetrakis (β-lauryl thiopropionate) was replaced with 2,4-bis[(octylthio)methyl]-o-cresol.

Comparative Examples 25 and 26 and Examples 25 and 26—Comparison of Color Change (Yellowness) After Heat Aging of Various Stabilized MBS Modifiers in Polybutylene Terephthlate (PBT) Compound Below is a comparison of the color change (yellowness) according to change in yellowness index (Delta YI), in a PBT compound using various stabilized MBS modifiers.

TABLE VI

| Oven Aging at 160° C. (hours) | COLOR CHANGE - Delta YI | | | |
|---|---|---|---|---|
| | MBS (1) + PBT | MBS (4) + PBT | MBS (5) + PBT | MBS (6) + PBT |
| 12 | 79 | 18 | 4 | 7 |
| 24 | 98 | 88 | 6 | 9 |
| 36 | 108 | 118 | 25 | 36 |
| 48 | 118 | 140 | 97 | 108 |

MBS (6) was the same as MBS (5) except in the stabilizer package, pentaerythritol tetrakis (β-lauryl thiopropionate) was replaced with 2,4-bis[(octylthio)methyl]-o-cresol.

We claim:

1. A stabilized methacrylate-butadiene-styrene core shell graft copolymer formed from a rubber-elastic core comprising polybutadiene, a hard graft shell, and a stabilizer formulation composed of at least one hindered phenol, an organic phosphite, an organic sulfide, wherein the sulfide has one or more sulfide groups of the formula —$CH_2$—S—R, wherein R is an alkyl group, and a pH buffer system for the range of about 7 to about 11.

2. The stabilized methacrylate-butadiene-styrene core shell graft copolymer of claim 1 wherein the rubber-elastic core comprises polybutadiene or poly(butadiene/styrene).

3. The stabilized methacrylate-butadiene-styrene core shell graft copolymer of claim 2 wherein the hard graft shell comprises poly(meth)acrylate.

4. The stabilized methacrylate-butadiene-styrene core shell graft copolymer of claim 2 wherein the hard graft shell of component B comprises poly(meth)acrylate and polystyrene.

5. The stabilized methacrylate-butadiene-styrene core shell graft copolymer of claim 4 wherein the pH buffer system comprises disodium hydrogen phosphate and trisodium phosphate.

6. The stabilized methacrylate-butadiene-styrene core shell graft copolymer of claim 4 wherein the pH buffer system comprises sodium hydroxide and phosphoric acid.

7. The stabilized methacrylate-butadiene-styrene core shell graft copolymer of claim 4 wherein the pH buffer system comprises disodium hydrogen phosphate or trisodium phosphate.

8. The stabilized methacrylate-butadiene-styrene core shell graft copolymer of claim 1 wherein the sulfide is 2,4-bis((octylthio)methyl)-o-cresol, pentaerythritol tetrakis (octyl thiopropionate), trimethylolpropane tris(octyl thiopropionate), or pentaerythritol tetrakis (β-lauryl thiopropionate).

9. A stabilized methacrylate-butadiene-styrene core shell graft copolymer formed from a rubber-elastic core comprising polybutadiene, a hard graft shell, and a stabilizer formulation composed of at least one hindered phenol, a pH buffer system for the range of about 7 to about 11, and an organic sulfide, wherein the sulfide has one or more sulfide groups of the formula —CH$_2$—S—R wherein R is an alkyl group.

10. An improved thermoplastic composition comprising a thermoplastic selected from polycarbonates; poly(alkylene terephthalates); polyester and polycarbonate blends; polyurethanes; poly(aromatic ketones); poly(phenylene ethers); poly(phenylene sulfides); phenoxy resins; polysulfones; poly(ether imides); poly(ether imide esters); copoly(ether imide esters); poly(ester carbonates); polyarylates; poly(glutarimides); aromatic polyimides; crystalline polyamides; amorphous polyamides; poly(amide imides); thermoplastic elastomers; poly(ether esters); poly(ether amides); and blends thereof, and 5–50% by weight, relative to the total mixture, of:
  (a) a stabilized methacrylate-butadiene-styrene core shell graft copolymer formed from a rubber-elastic core comprising polybutadiene, a hard graft shell, and a stabilizer formulation composed of at least one hindered phenol, an organic phosphite, an organic sulfide wherein the sulfide has one or more sulfide groups of the formula —CH$_2$—S—R, wherein R is an alkyl group, and a pH buffer system for the range of about 7 to about 11, or
  (b) a combination of an organic sulfide, wherein the sulfide has one or more sulfide groups of the formula —CH$_2$—S—R, wherein R is an alkyl group, and a stabilized methacrylate-butadiene-styrene core shell graft copolymer containing one or more hindered phenols, an organic phosphite, and a pH buffer system for the range of about 7 to about 11, or
  (c) a combination of an organic sulfide wherein the sulfide has one or more sulfide groups of the formula —CH$_2$—S—R, wherein R is an alkyl group, an organic phosphite, and a stabilized MBS core shell graft copolymer containing one or more hindered phenols and a pH buffer system for the range of about 7 to about 11.

11. An improved thermoplastic composition as claimed in claim 10, wherein the thermoplastic is a polycarbonate.

12. An improved thermoplastic composition as claimed in claim 10, wherein the rubber-elastic core of the methacrylate-butadiene-styrene core shell graft copolymer comprises polybutadiene or poly(butadiene/styrene).

13. An improved thermoplastic composition as claimed in claim 10, wherein the hard graft shell of the methacrylate-butadiene-styrene core shell graft copolymer comprises poly(meth)acrylate.

14. An improved thermoplastic composition as claimed in claim 10, wherein the hard graft shell of the methacrylate-butadiene-styrene core shell graft copolymer comprises poly(meth)acrylate and polystyrene.

15. An improved thermoplastic composition as claimed in claim 10, wherein the pH buffer system comprises disodium hydrogen phosphate and trisodium phosphate.

16. An improved thermoplastic composition as claimed in claim 10, wherein the pH buffer system comprises sodium hydroxide and phosphoric acid.

17. An improved thermoplastic composition as claimed in claim 10, wherein the pH buffer system comprises disodium hydrogen phosphate or trisodium phosphate.

18. An improved thermoplastic composition as claimed in claim 10, wherein the sulfide is 2,4-bis((octylthio)methyl)-o-cresol, pentaerythritol tetrakis (octylthiopropionate), trimethylolpropane tris(octyl thiopropionate) or pentaerythritol tetrakis(β-lauryl thiopropionate).

19. An improved thermoplastic composition as claimed in claim 10, wherein the thermoplastic is a polyester.

20. An improved thermoplastic composition as claimed in claim 19, wherein the polyester is polybutylene terephthalate.

21. An improved thermoplastic composition as claimed in claim 10, wherein the thermoplastic additionally contains one or more additives, in the form of a stabilizer, nucleating agent, antistatic agent, light stabilizer, flame-retarding agent, strip agent, lubricant, plasticizer, pigment, dyestuff, optical brightener or processing aids, the total amount of which is up to 50% by weight, relative to the total improved thermoplastic composition.

22. An improved thermoplastic composition as claimed in claim 19, wherein the polyester is polyethylene terephthalate.

23. A shaped article produced from the improved thermoplastic composition as claimed in claim 10.

* * * * *